(12) United States Patent
Oh

(10) Patent No.: US 10,605,224 B2
(45) Date of Patent: Mar. 31, 2020

(54) HYDROELECTRIC POWER GENERATOR USING EBB AND FLOW OF SEAWATER

(71) Applicant: Taekgeun Oh, Daejeon (KR)

(72) Inventor: Taekgeun Oh, Daejeon (KR)

( * ) Notice: Subject to any disclaimer, the term of this patent is extended or adjusted under 35 U.S.C. 154(b) by 241 days.

(21) Appl. No.: 15/549,120

(22) PCT Filed: Jan. 29, 2016

(86) PCT No.: PCT/KR2016/000969
§ 371 (c)(1),
(2) Date: Aug. 4, 2017

(87) PCT Pub. No.: WO2016/129835
PCT Pub. Date: Aug. 18, 2016

(65) Prior Publication Data
US 2018/0023537 A1     Jan. 25, 2018

(30) Foreign Application Priority Data

Feb. 12, 2015 (KR) .......................... 10-2015-0021575

(51) Int. Cl.
*F03B 15/06* (2006.01)
*F03B 7/00* (2006.01)
(Continued)

(52) U.S. Cl.
CPC ................ *F03B 15/06* (2013.01); *F03B 7/00* (2013.01); *F03B 13/10* (2013.01); *F03B 13/26* (2013.01); *F03B 13/264* (2013.01); *F03B 15/02* (2013.01); *F03B 17/06* (2013.01); *F05B 2220/32* (2013.01); *F05B 2220/706* (2013.01); *F05B 2240/12* (2013.01); *F05B 2240/20* (2013.01); *Y02E 10/223* (2013.01); *Y02E 10/28* (2013.01); *Y02E 10/38* (2013.01)

(58) Field of Classification Search
CPC .. F03B 7/00; F03B 13/26; F03B 15/02; F03B 15/06; F03B 17/067
See application file for complete search history.

(56) References Cited

U.S. PATENT DOCUMENTS

| 8,354,758 B1 | 1/2013 | Boschma |
| 8,702,392 B2 * | 4/2014 | Kumano ................... F03B 7/00 |
| | | 416/119 |

(Continued)

FOREIGN PATENT DOCUMENTS

| CN | 102449299 | 5/2012 |
| CN | 104100450 | 10/2014 |

(Continued)

*Primary Examiner* — Igor Kershteyn
*Assistant Examiner* — Jason G Davis
(74) *Attorney, Agent, or Firm* — Jake K. Lee

(57) ABSTRACT

The present invention relates to a hydroelectric power generator using ebb and flow of seawater. More particularly, the hydroelectric power generator is able to continuously generate power through high tide and low tide created according to a tidal difference that continuously occurs, while being submerged in seawater, using a marine current that flows fast. The hydroelectric power generator is also able to utilize eco-friendly energy that does not require a reservoir by adjusting the amount of inflow of seawater and to be installed at various places, while being varied in size, as necessary.

12 Claims, 17 Drawing Sheets

(51) Int. Cl.
*F03B 13/26* (2006.01)
*F03B 15/02* (2006.01)
*F03B 13/10* (2006.01)
*F03B 17/06* (2006.01)

(56) References Cited

U.S. PATENT DOCUMENTS

| | | | |
|---|---|---|---|
| 8,933,575 B2 * | 1/2015 | Lipman | F03B 13/264 290/54 |
| 2014/0035283 A1 | 2/2014 | Park | |
| 2014/0217738 A1 | 8/2014 | Lipman | |
| 2015/0252774 A1 * | 9/2015 | Shimizu | F03B 17/065 416/7 |

FOREIGN PATENT DOCUMENTS

| | | |
|---|---|---|
| DE | 3911125 A1 | 10/1990 |
| DE | 10 2011 055783 | 5/2013 |
| DE | 10 2012 021674 A1 | 5/2014 |
| EP | 1 849 999 A2 | 10/2007 |
| JP | S50-132339 | 10/1975 |
| JP | S62-267577 | 11/1987 |
| JP | 2011-074921 | 4/2011 |
| JP | 2011-127613 | 6/2011 |
| JP | 2014 015923 A | 1/2014 |
| KR | 10-2002-0066908 | 8/2002 |
| KR | 10-0501543 | 7/2005 |
| KR | 10-2006-0035710 | 4/2006 |
| KR | 10-2009-0010535 | 1/2009 |
| KR | 10-2009-0032440 | 4/2009 |
| KR | 10-2010-0133043 | 12/2010 |
| KR | 10-2011-0068118 | 6/2011 |
| KR | 10-1127565 | 3/2012 |
| KR | 10-1418011 | 7/2014 |
| WO | WO-2014065282 A1 * | 5/2014 ............ F03B 17/065 |

* cited by examiner

HYDROELECTRIC POWER GENERATOR USING EBB AND FLOW OF SEAWATER

CROSS-REFERENCE TO RELATED APPLICATIONS

This application is a national stage application of International Patent Application No. PCT/KR2016/000969 filed on Jan. 29, 2016, which claims priority to Korean Patent Application No. 10-2015-0021575 filed on Feb. 12, 2015, the entire contents of which are incorporated by reference herein.

TECHNICAL FIELD

The present invention relates to a hydroelectric power generator using ebb and flow of seawater. More particularly, the present invention relates to a hydroelectric power generator using ebb and flow of seawater, the hydroelectric power generator being able to continuously generate power by continuously rotating in the same direction at high tide and low tide that occur according to a tidal difference that continuously occurs, while being submerged in seawater, using a marine current that flows fast, to utilize eco-friendly energy by adjusting the amount of inflow of seawater, to be installed at various places, and to be varied in size, if necessary.

BACKGROUND

The present invention relates to power generation using tides as a marine resource. Tidal power generation, which is a kind of power generation method using natural energy resources and which is under development, generates electricity from the kinetic energy of a tide using a water turbine generator installed at a place with a high-speed tide. Tidal power generation using a tide is included in marine current power generation methods in a broad sense (hereafter, 'tidal power generation' and 'tide' are referred to as 'marine current power generation' and 'marine current' in combination) and is classified into a helical type, an HAT (Horizontal Axis Turbine) type, and a VAT (Vertical Axis Turbine) type in accordance with the types of water turbine generators, and also classified into a floating type and a submerged type in accordance with the type of water turbine generator installation.

Tidal power generation generates electricity using the tidal range between the marine currents inside and outside artificial seawalls (reservoirs), but marine current power generation generates electricity generally using a water turbine generator installed in the flow of a natural marine current.

Marine current power generation is similar in principle to wind power generation, but is different in that it operates a turbine using a continuous marine current instead of wind. However, the power/area density is about four times larger in the marine current power generation method, as compared with the power generation method using ocean wind, because the density of seawater is about 840 times larger than that of the air. Hence, the facilities required for the marine current power generation are much smaller than those for the wind power generation for the same output capacity.

The output that can be achieved by marine current power generation is in proportion to the efficiency of a water turbine generator and the cross-sectional area of a marine current flowing through the water turbine generator and is in proportion to the cube of a marine current speed, so a high speed is absolutely advantageous in marine current power generation.

The tidal and marine current energy, which is energy from the attraction among the moon, sun, and earth, is an infinite clean energy source as long as the solar system exists, and is not influenced by weather and seasons due to the periodicity of the ebb and flow. Further, there is an advantage that it is possible to expect output for a long period of time, continuously supply power for a predetermined time, and provide easy connection to a power network. However, there is a disadvantage that power is not continuously generated, and when the power generation site is far from the shore, the initial investment cost is high, for example, due to installation of power transmission lines.

Places where tides are fast such as a narrow strait between an island and the land, that is, places where the average speed of tides is 2 m/s or more at a spring tide have been examined as target areas for marine current power generation. However, though tidal power generation has already been used, marine current power generation is not widely used in a large scale over the world. This is because natural sea areas where marine currents are fast such that marine current power generation is possible are very limited over the world, so it is difficult to find appropriate places for installing water turbine generators. Further, even if the average speed of marine currents is satisfied, the speed of marine currents may not be uniform, depending on the submarine topography of the area where a marine current power plant is constructed, and when the flow direction of marine currents is not fixed, it is difficult to ensure structural stability of a water turbine generator and control the amount of power generation with high reliability.

In general, in normal marine current power plants, the average speed of marine currents is 2~2.5 m/s, the flow direction of marine currents frequently changes, and power generation is much influenced by the topography. However, marine currents that can be obtained in a tidal power plant have more uniform and available kinetic energy than natural marine currents. Actually, it has been reported from Siwha Lake Tidal Power Station (South Korea) that is a one-way rising tidal type that the average speed of water discharged to the lake through a water turbine generator was 3 m/s or more when power is generated using a tidal range of 6 m at high tide, and the average speed of seawater that was sluiced at a tidal range of 1.9 m was 6.0 m/s at low tide.

It is very difficult to achieve normal hydroelectric power generation with those various conditions satisfied, so hydroelectric power generation is not actually widely used. However, at present, studies for conveniently applying hydroelectric power generation to various places where there are various tidal differences are conducted and it is necessary to apply the hydroelectric power generation at this point.

PRIOR ART DOCUMENT (Patent Document 1) Document 1. Korean Patent No. 0501543 (2005 Jul. 6)
(Patent Document 2) Document 2. Korean Patent Application Publication No. 2009-0010535 (2009 Jan. 30)
(Patent Document 3) Document 3. Korean Patent Application Publication No. 2009-0032440 (2009 Apr. 1)
(Patent Document 4) Document 4. Korean Patent Application Publication No. 2010-0133043 (2010 Dec. 21)

SUMMARY

Accordingly, the present invention has been made in an effort to solve the problems in the related art and an object of the present invention is to provide a hydroelectric power generator that uses eco-friendly energy without a reservoir by operating a turbine under the seawater, using ebb and flow of seawater flowing at high speeds and occurring due to a continuous tidal difference.

Another object of the present invention is to construct a hydroelectric power generator in various numbers, sizes, and widths on the ground or at a predetermined height from the ground.

Another object of the present invention is to achieve high-efficiency power generation by maximizing rotational energy by increasing an angular speed by adjusting a flow speed and pressure applied to a turbine and blades by adjusting the amount of seawater flowing therethrough.

Another object of the present invention is to achieve high-efficiency power generation by making flow and rotation of a turbine and blades in the same direction.

Another object of the present invention is to achieve high-efficiency power generation by increasing an angular speed at the same flow speed by adjusting the number and radius of blades of a turbine.

Another object of the present invention is to achieve high-efficiency power generation by generating torque corresponding to the number of blades from a rotary shaft by generating the same pressure on the blades by generating a water head with a predetermined gap between ends of blades and a guide unit.

Another object of the present invention is to achieve high-efficiency power generation by making the speed and pressure of water discharged through a discharge space from an outlet of a turbine the same as or larger than a flow speed and water pressure outside the turbine so that water can be easily discharged from the turbine.

A hydroelectric power generator according to an aspect of the present invention includes: a flood power generation unit including: a lower flow guide unit disposed between side guides and having a blade guide at a front end of an upper flow guide; a turbine disposed on a turbine shaft over the lower flow guide unit, having reinforcing grooves formed in blade seats formed on an outer side of the turbine such that reinforcing portions of blades fit to two sides, and having fixed shafts disposed through the blade seats; the blades fitted on the fixed shafts passing through the turbine in the blade seats to be deployed by seawater and rotate the turbine; and an upper flow guide unit disposed over the lower flow guide unit between the side guides and having a power generation guide in which the blades on the outer side of the turbine are deployed and moved; and an ebb power generation unit including: an upper flow guide unit disposed between side guides and having a blade guide at a front end of an upper flow guide; a turbine disposed on a turbine shaft under the upper flow guide unit, having reinforcing grooves formed in blade seats formed on an outer side of the turbine such that reinforcing portions of blades fit to two sides, and having fixed shafts disposed through the blade seats; the blades fitted on the fixed shafts disposed through the turbine in the blade seats to be deployed and rotate the turbine by seawater; and a lower flow guide unit disposed under the upper flow guide unit between the side guides and having a power generation guide in which the blades on the outer side of the turbine are deployed and moved.

The lower flow guide unit has a lower guide having a streamlined bottom, a blade guide where the turbine is disposed is formed at a front end of a flow guide formed at a front upper portion, and a lower drainage horizontally forming a drain space is formed at a front end of the blade guide.

The blades are fitted on the fixed shafts, are rotatably coupled at both sides by bushings, have an outer front end protruding from the blade seats, and have the reinforcing portion fitting to two sides of the reinforcing grooves.

The present invention continuously generates power using eco-friendly energy that does not require a reservoir by continuously rotating a turbine under the ocean at high tide and low tide that occur due to a tidal difference, using a marine current that flows fast, so it is possible to very efficiently generate power as compared with common tidal power generation.

According to the present invention, since the hydroelectric power generator is installed on the ground or at a predetermined distance from the ground under the sea, it is possible to effectively use the energy of marine currents and efficiently generate power using generators in various numbers, sizes, and widths.

Further, it is possible to supply a necessary amount of seawater for power generation by controlling the flow speed and amount of seawater through the control gate and it is also possible to increase strength for resisting load applied to the blades, which are reclined or deployed by seawater on the turbine, by seawater and to efficiently generate power.

Further, it is possible to maximize rotational energy by increasing the angular speed of the turbine by controlling the pressure of seawater applied to the turbine and the blades by controlling the amount of seawater by controlling the angle of the control gate, whereby high-efficiency power generation is possible.

Further, since the flow direction of the marine current and the movement directions of the turbine and the blades are the same in the ocean, it is possible to generate power with high efficiency.

Further, it is possible to generate power with high efficiency by increasing the angular speed at the same flow speed by controlling the numbers and radius of the blades of the turbine.

Further, since velocity heads are made by the gap between the ends of the blades and the power generation guide, so the same pressure is applied to the blades and torque corresponding to the number of the blades is applied to the rotary shaft of the turbine, high-efficiency power generation is achieved.

Further, the outlet of the turbine is formed such that the flow speed and pressure of the seawater discharged from the drain space are the same as or larger than those generated by the lower flow guide unit and the upper flow guide unit outside the turbine so that seawater can be easily discharged from the turbine, thereby achieving high-efficiency power generation.

DETAILED DESCRIPTION OF PREFERRED EMBODIMENTS

Exemplary embodiments of the present invention are described hereafter in detail with reference to the accompanying drawings.

Figure 1:
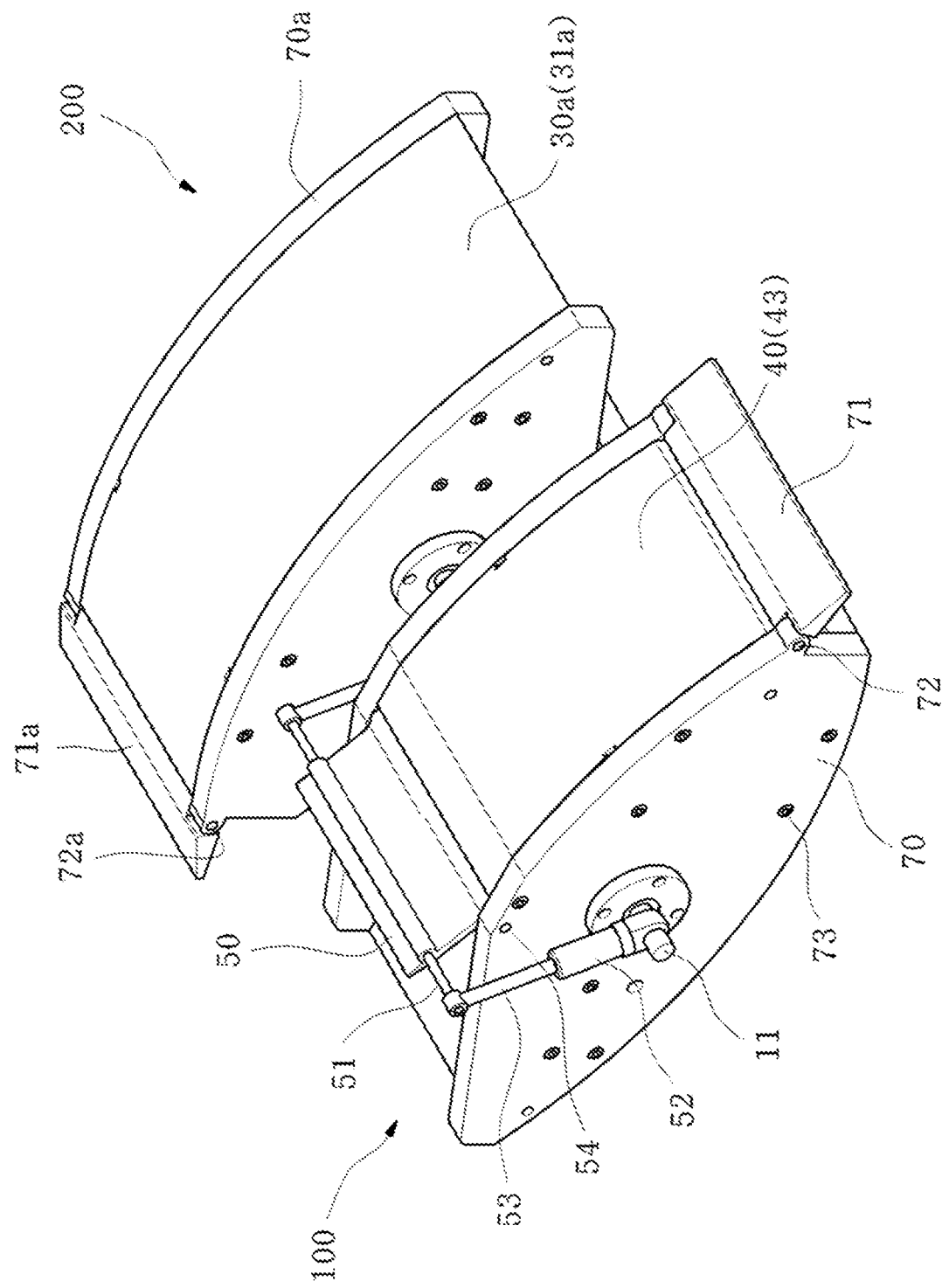
FIG. 1 is a perspective view showing installation of an embodiment of the present invention.
Figure 2:
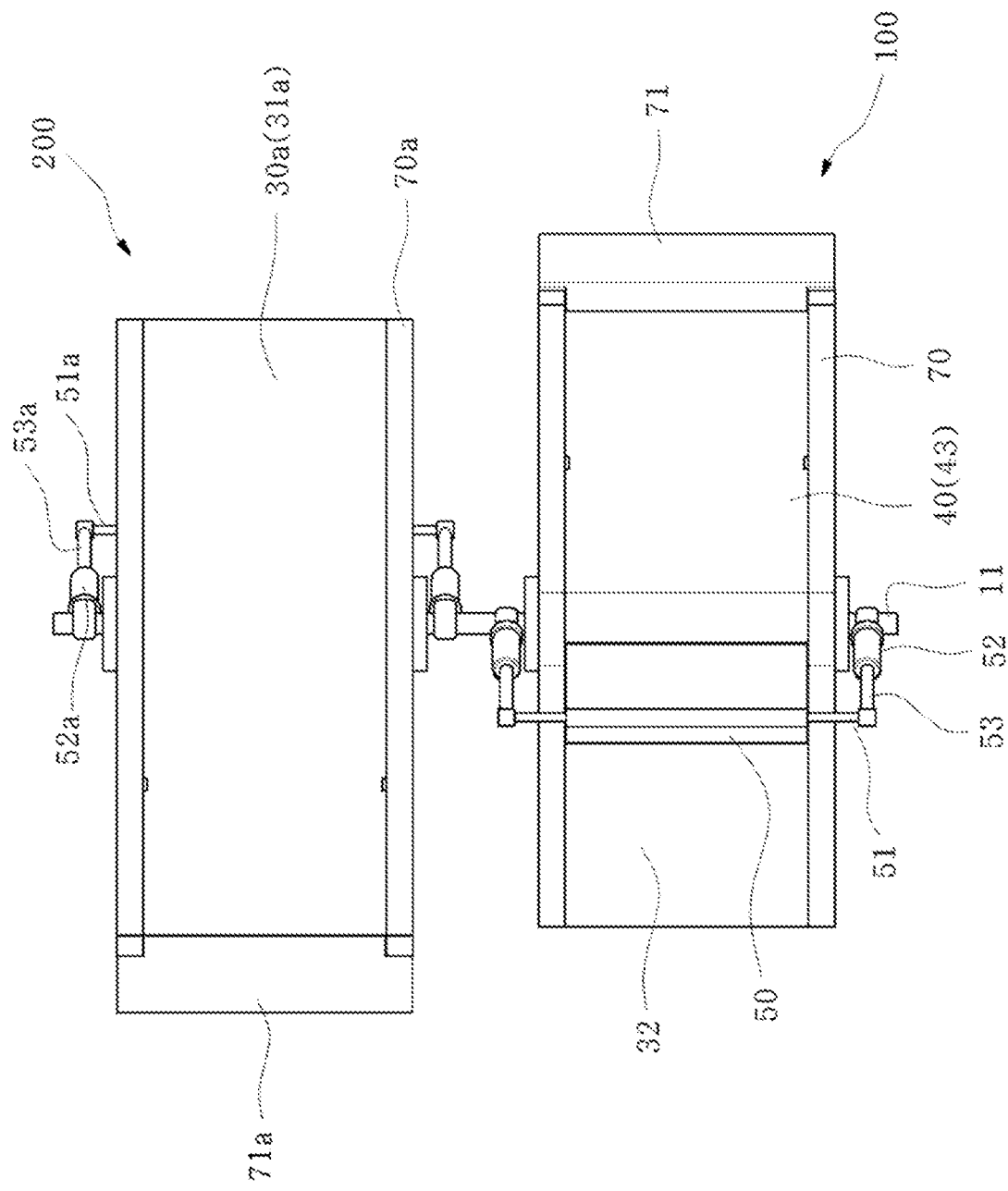
FIG. 2 is a plan view when the present invention is applied to an ebb tide and a flood tide.
Figure 3:
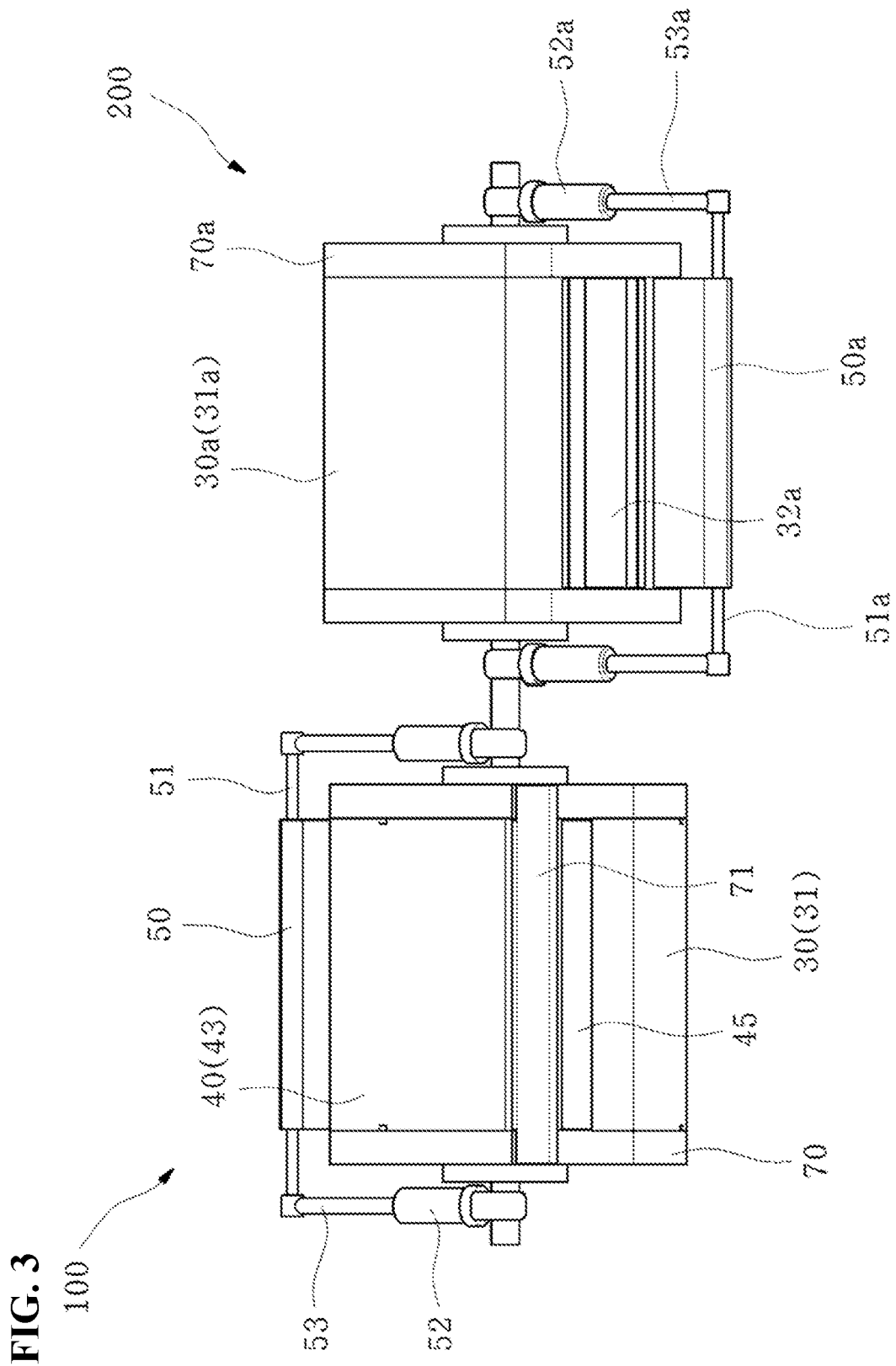
FIG. 3 is a side view when the present invention is applied to an ebb tide and a flood tide.
Figure 4:
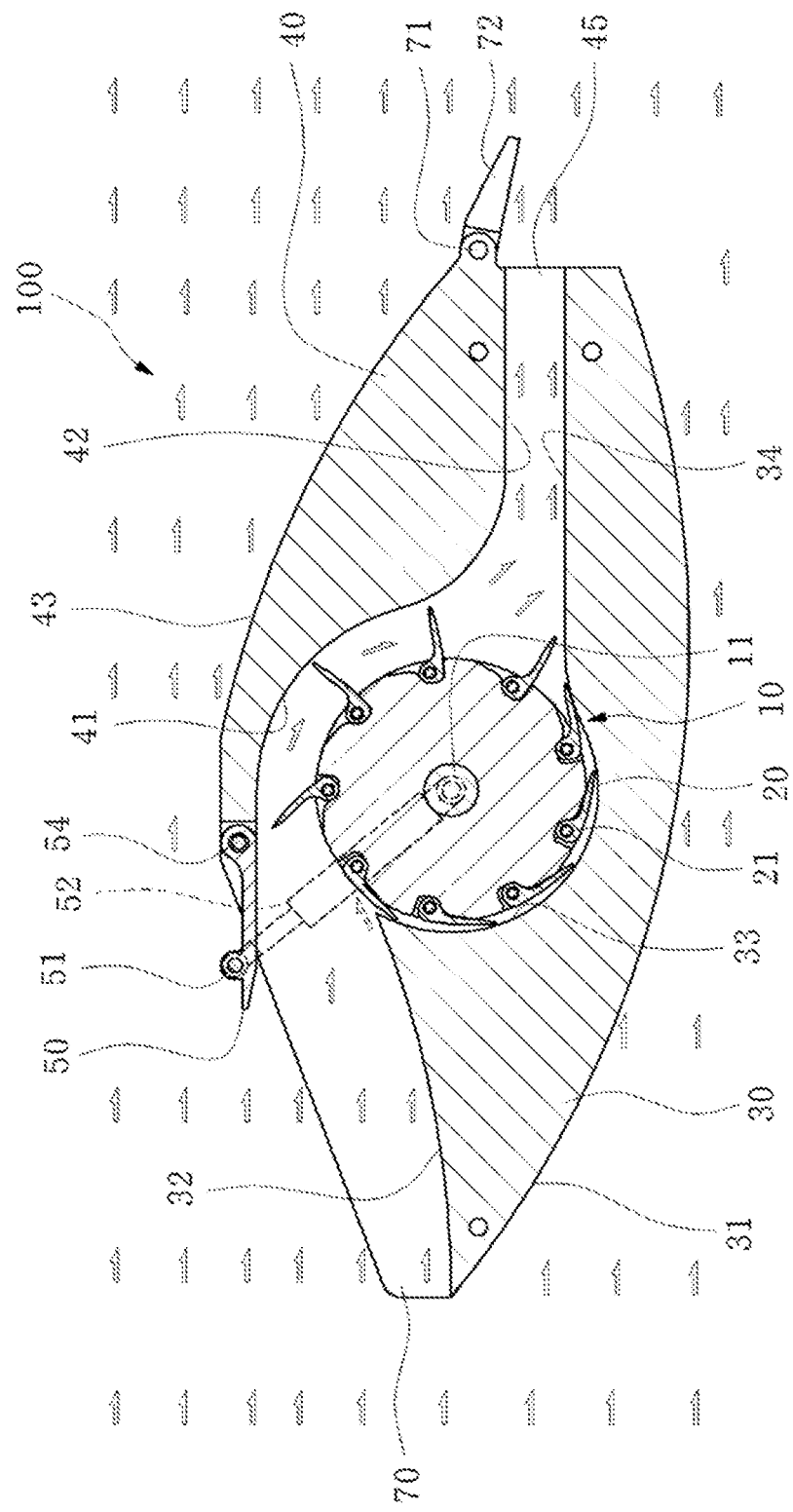
FIG. 4 is a front cross-sectional view of a flood power generation unit of the present invention.
Figure 5:
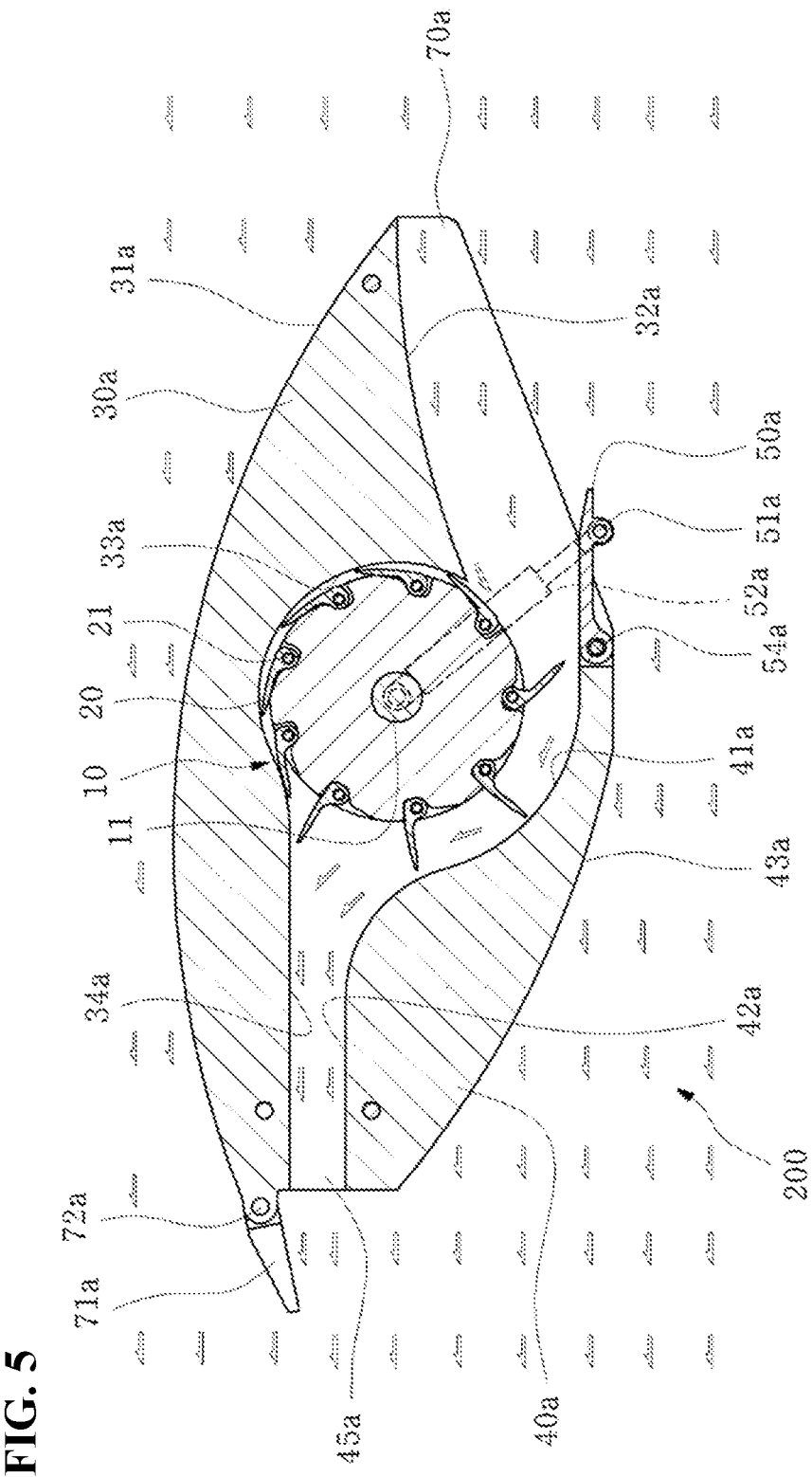
FIG. 5 is a front cross-sectional view of an ebb power generation unit of the present invention.
Figure 6:
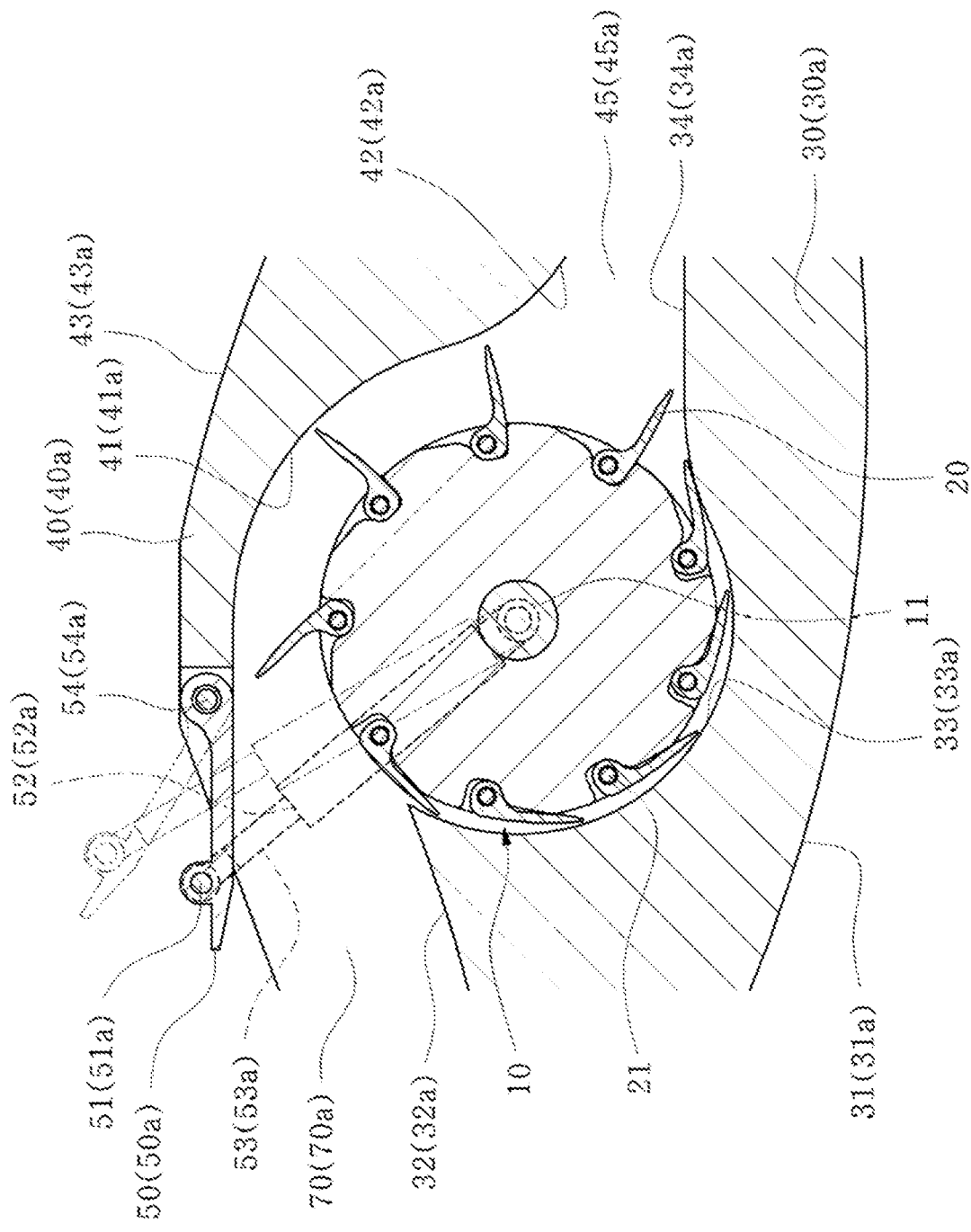
FIG. 6 is an enlarged cross-sectional view showing main parts of the present invention.

FIG. 1 is a perspective view showing installation of an embodiment of the present invention, FIG. 2 is a plan view when the present invention is applied to an ebb tide and a flood tide, FIG. 3 is a side view when the present invention is applied to an ebb tide and a flood tide, FIG. 4 is a front cross-sectional view of a flood power generation unit of the present invention, FIG. 5 is a front cross-sectional view of an ebb power generation unit of the present invention, and FIG. 6 is an enlarged cross-sectional view showing main parts of the present invention.

Flood power generation units 100 using flood tide to generate power and ebb power generation units 200 using ebb tide to generate power are sequentially or alternately installed under the seawater.

The flood power generation unit 100 includes side guide units 70 that determine the width of blades 20 at both sides, and a lower flow guide unit 30 and an upper flow guide unit 40 that are fixed by bolts 73 to both sides between the side guide units 70.

A turbine 10 having a plurality of blades 20, which is formed with regular intervals on the outer side of the turbine 10 and is naturally reclined or deployed by water when rotating, is disposed on the center portion of the top of the lower flow guide unit 30 to be rotated on a turbine shaft 11.

The turbine 10 is integrally fixed to fixed bushing 15 at both sides and rotatably installed inside the side guide units 70.

A control gate 50 that controls the amount and speed of flood tide flowing into the turbine 10 is disposed at the front of the upper flow guide unit 40.

The lower flow guide unit 30 has a lower guide 31 having a streamlined bottom so that seawater can normally flow under it, and a streamlined flow guide 32 at the front portion on the top. Further, an arc-shaped blade guide 33 is formed at the right side of the flow guide 32 so that the blades 20 are reclined when the turbine 10 is rotated, and a lower drainage 34 formed horizontally or formed wider as it goes to the outlet is formed so that a drain space 45 is formed at the right side of the blade guide 33.

The drain space 45 is the same as or wider than the gap between the turbine 10 and a power generation guide 41 to make the speed and pressure of water that is discharged the same as or larger than the external flow speed and pressure so that water can be easily discharged.

The upper flow guide unit 40 has the control gate 50 coupled to the front through a gate rotary shaft 54 and a power generation guide 41 guiding seawater under it to rotate the blades 20. The upper drainage 42 is horizontally formed such that the drain space 45 is formed at the right side of the power generation guide 41 and a streamlined upper guide 43 is formed at the right side of the control gate 50 so that seawater normally flows.

Gate control cylinders 52 each having a cylinder shaft 53 connected to a gate shaft 51 coupled to the control gate 50 are connected to the turbine shaft 11 so that the amount of seawater that is supplied to the turbine 10 can be controlled by controlling the opening/closing angle of the control gate 50.

A decelerator or a power generation unit is connected to the turbine shaft 11 to generate power using torque from the turbine 10.

A plurality of turbines 10, lower flow guide units 30, and upper flow guide units 40 may be installed, depending on the stream of a watercourse, may be sequentially installed, depending on the direction of flood tide, or may be submerged in the seawater.

A door 71 for opening/closing the drain space 45 is rotatably coupled to the front end of the drain space 45, that is, the right ends of the side guides 70 through a door shaft 72 to be naturally opened by inflow of seawater and closed by its weight when there is no flow of seawater.

The ebb power generation unit 200 is installed as if the flood power generation unit 100 is turned over so that the turbine shaft 11 is rotated in one direction, and has an upper flow guide unit 30a and a lower flow guide unit 40a fixed at both sides between side guides 70a to determine the width of blades 20.

A turbine 10 having a plurality of blades 20, which is formed with regular intervals on the outer side of the turbine 10 and is naturally reclined or deployed by water when rotating, is disposed on the center portion of the bottom of the upper flow guide unit 30a to be rotated on the turbine shaft 11.

The turbine 10 is integrally fixed to fixed bushing 15 at both sides and rotatably installed inside the side guides 70.

A control gate 50 that controls the amount and speed of ebb tide flowing into the turbine 10 is disposed at the front of the lower flow guide unit 40a.

The upper flow guide unit 30a has an upper guide 31a having a streamlined bottom so that seawater can normally flow under it, and a streamlined flow guide 32a at the front portion on the bottom. Further, an arc-shaped blade guide 33a is formed at the left side of the flow guide 32a so that the blades 20 are reclined when the turbine 10 is rotated, and an upper drainage 34a formed horizontally or formed wider as it goes to the outlet is formed so that a drain space 45a is formed at the left side of the blade guide 33a.

The lower flow guide unit 40a has the control gate 50a coupled to the front through a gate rotary shaft 54a and a power generation guide 41a guiding seawater under it to rotate the blades 20. A lower drainage 42a is horizontally formed such that the drain space 45a is formed at the left side of the power generation guide 41a and a lower guide 43a having streamlined shape is formed at the left side of the control gate 50a so that seawater normally flows.

The upper drainage 34a and the lower drainage 42a are formed relatively long to provide the drain space 45a so that seawater can sufficiently flow.

Gate control cylinders 52a each having a cylinder shaft 53a connected to a gate shaft 51a coupled to the control gate 50a are connected to the turbine shaft 11 so that the amount and speed of seawater that is supplied to the turbine 10 can be controlled by controlling the opening/closing angle of the control gate 50a.

A decelerator or a power generation unit is connected to the turbine shaft 11 to generate power using torque from the turbine 10.

A door 71a for opening/closing the drain space 45a is rotatably coupled to the front end of the drain space 45a, that is, the left ends of the side guides 70a through a door shaft 72a to be naturally opened by inflow of seawater and closed when there is no flow of seawater.

Figure 7:
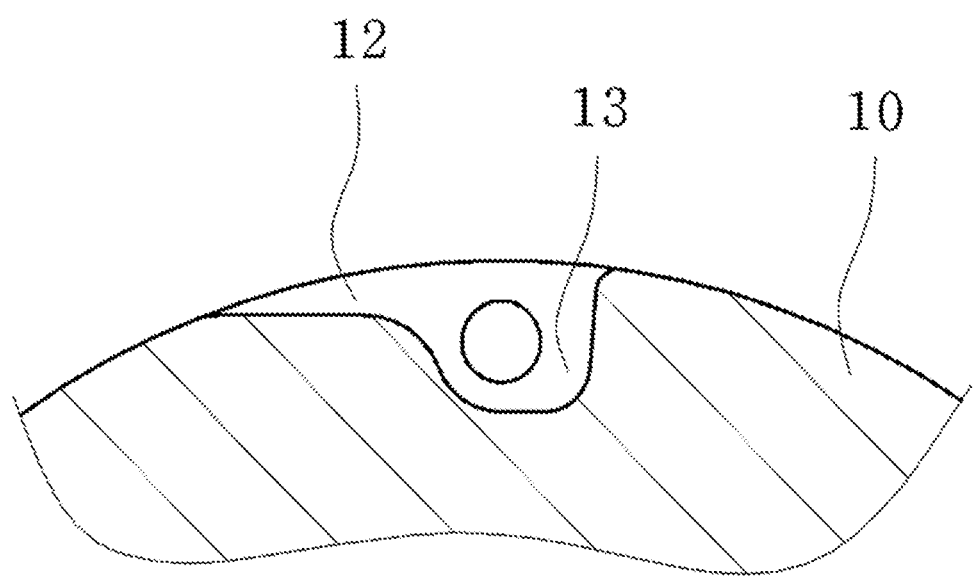
FIG. 7 is a front view of a turbine without a blade of the present invention.
Figure 8:
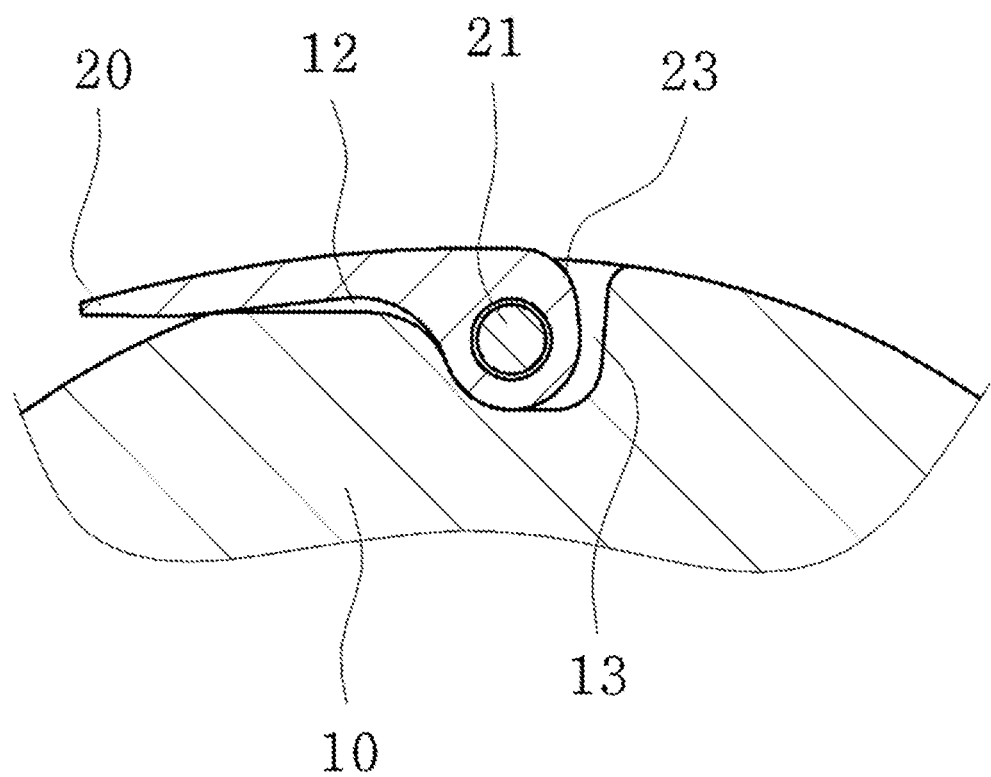
FIG. 8 is an enlarged front view when blades of the present invention are reclined.
Figure 9:
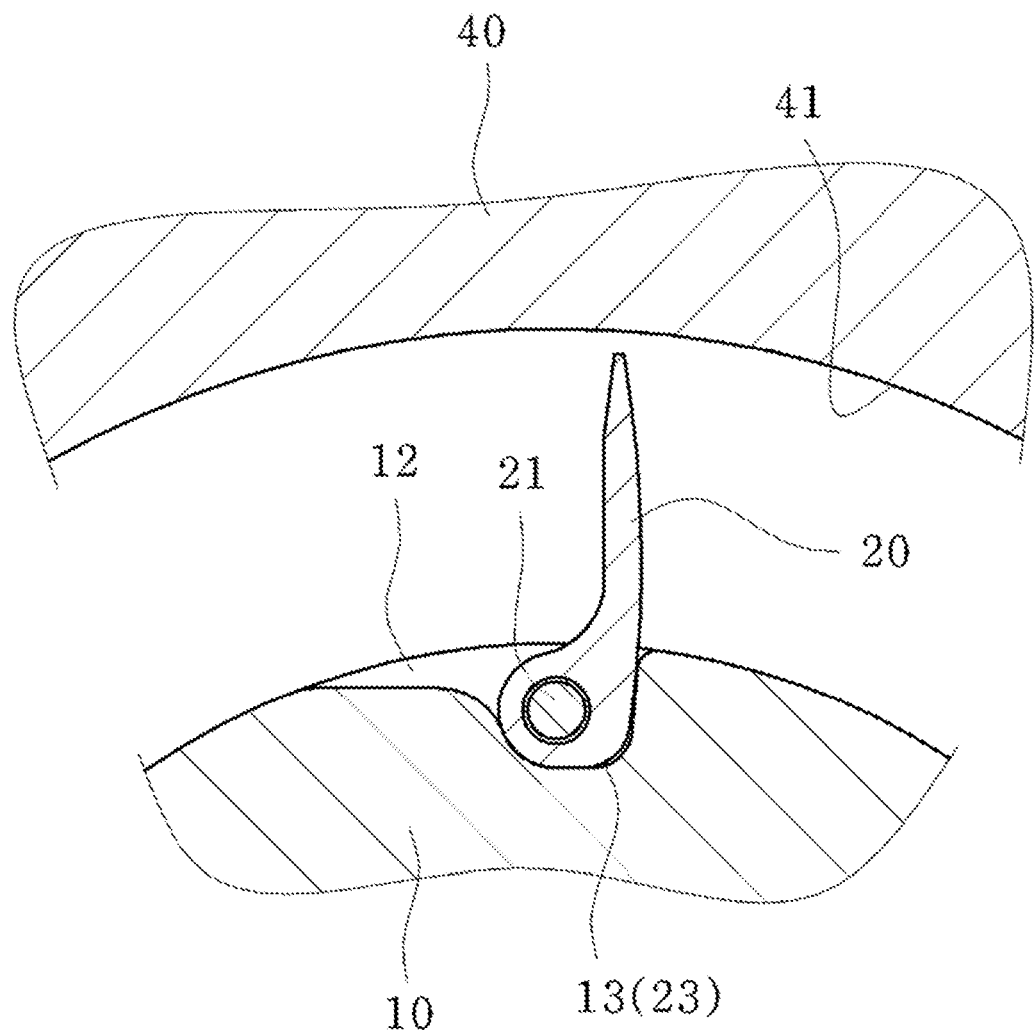
FIG. 9 is an enlarged front view when blades of the present invention are deployed.
Figure 10:
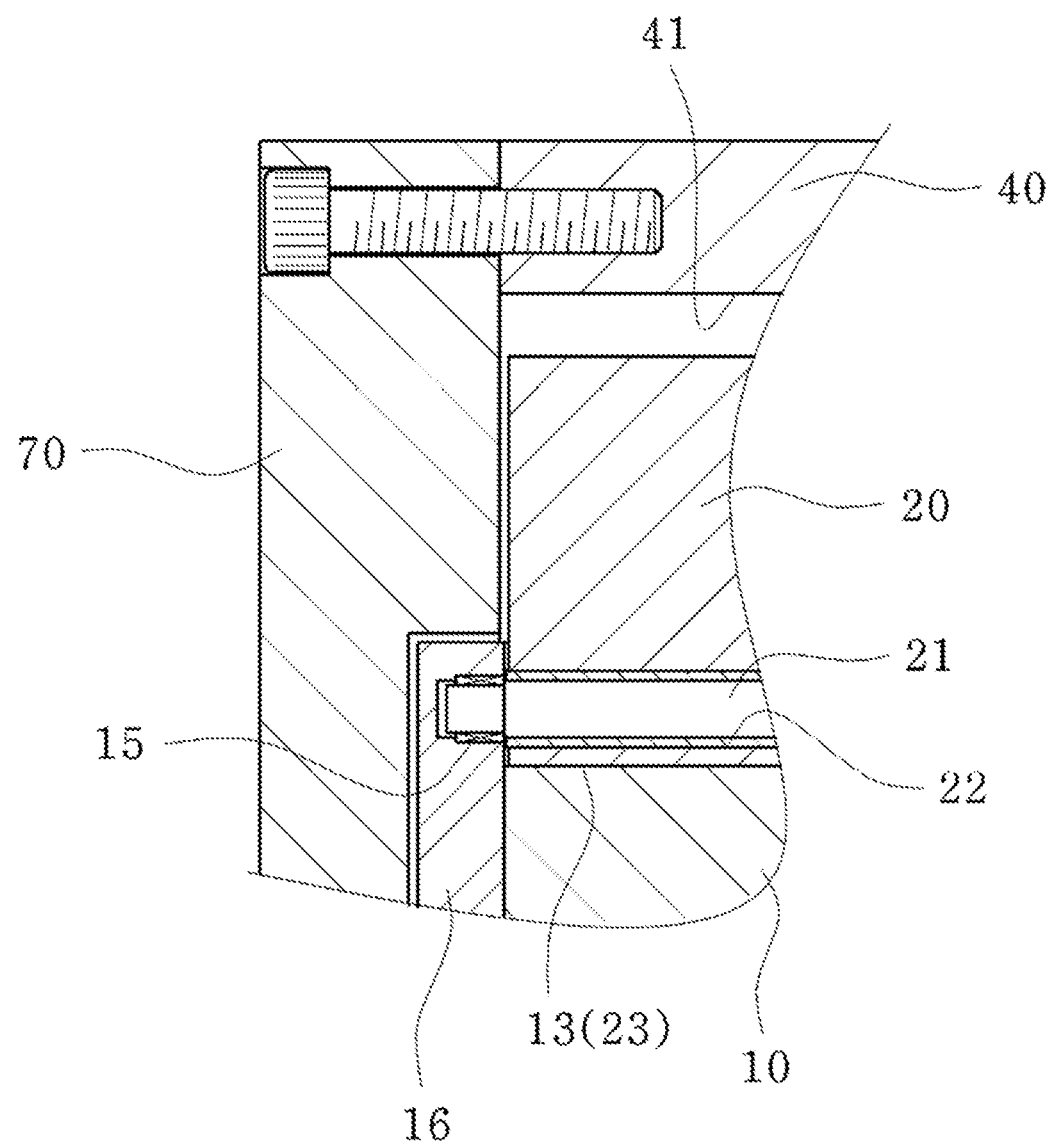
FIG. 10 is a side cross-sectional view when a turbine and blades of the present invention are combined.
Figure 11:
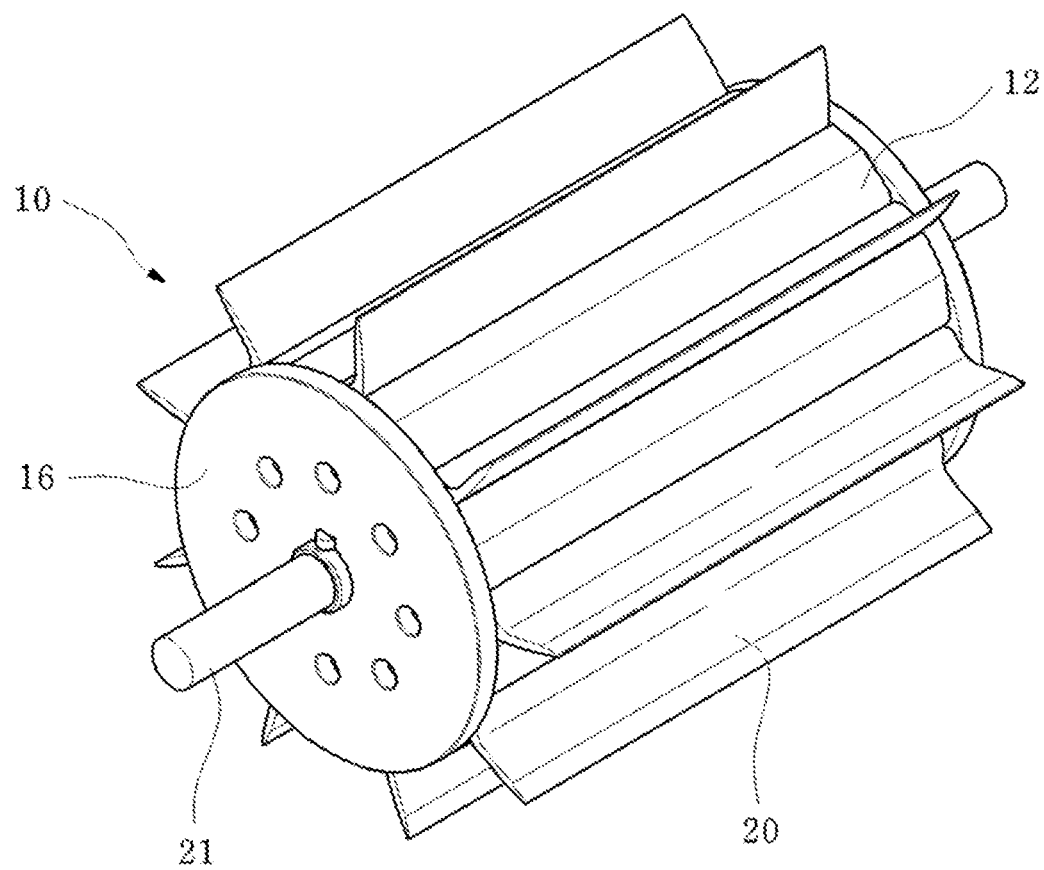
FIG. 11 is a perspective view when a turbine and blades of the present invention are combined.

FIG. 7 is a front view of a turbine without a blade of the present invention, FIG. 8 is an enlarged front view when blades of the present invention are reclined, FIG. 9 is an enlarged front view when blades of the present invention are deployed, FIG. 10 is a side cross-sectional view when a turbine and blades of the present invention are combined, and FIG. 11 is a perspective view when a turbine and blades of the present invention are combined.

The turbine 10 that is disposed in the flood power generation unit 100 and the ebb power generation unit 200 has a circular shape and has blade seats 12 allowing the blades 20 arranged with regular intervals to be reclined at a predetermined angle without interference. Further, an L-shaped reinforcing groove 13 rounded at the corner is formed at a side in each of the blade seats 12.

A fixed shaft 21 is disposed through the reinforcing grooves 13 on the turbine 10 to rotatably couple the blades 20.

The fixed shaft 21 is coupled to turbine covers 16 at both sides of the turbine 10 through a fixed bushing 15 and a movable bushing 22 is fitted on the fixed shaft 21 so that the blade 20 can rotate. The reinforcing groove 13 fits to the rear and bottom of a reinforcing portion 23 when the blade 20 is erected.

The fixed bushing 15 and movable bushing 22 are appropriate for small sizes and bearings may be fitted on the fixed shaft 21 instead of the fixed bushing 15 and the movable bushing 22.

Gaps between the blade guides 33 and 33a and the turbine 10 are formed narrow so that the blades 20 are rotated in a reclined position, while gaps between the power generation guides 41 and 41a and the turbine 10 are formed wide so that the blades 20 are deployed by seawater flowing to the turbine 10 to generate power.

The blade 20 vertically extends from the reinforcing portion 23 and is then curved upward at the end. Further, the blade 20 is rounded at the reinforcing portion 23, extends to fit to the blade seat 12, and is inclined downward at the front end of the blade seat 12. Further, the outer portion of the front end of the blade 20 partially protrudes out of the blade seat 12 when it is reclined to be turned and deployed by seawater or reclined inside the blade guides 33 and 33a.

The width, height, and size of the blades 20 may vary, depending on the flow speed of seawater at the position where they are installed and the amount of power generation.

The power generation guides 41 and 41a maintain the same gap from the position where the blades 20 are deployed and the position where seawater is discharged, and a gap is defined between the front ends of the blades 20 to the power generation guides 41 and 41a to make a velocity head so that the same pressure is applied to the blades 20.

Figure 12:
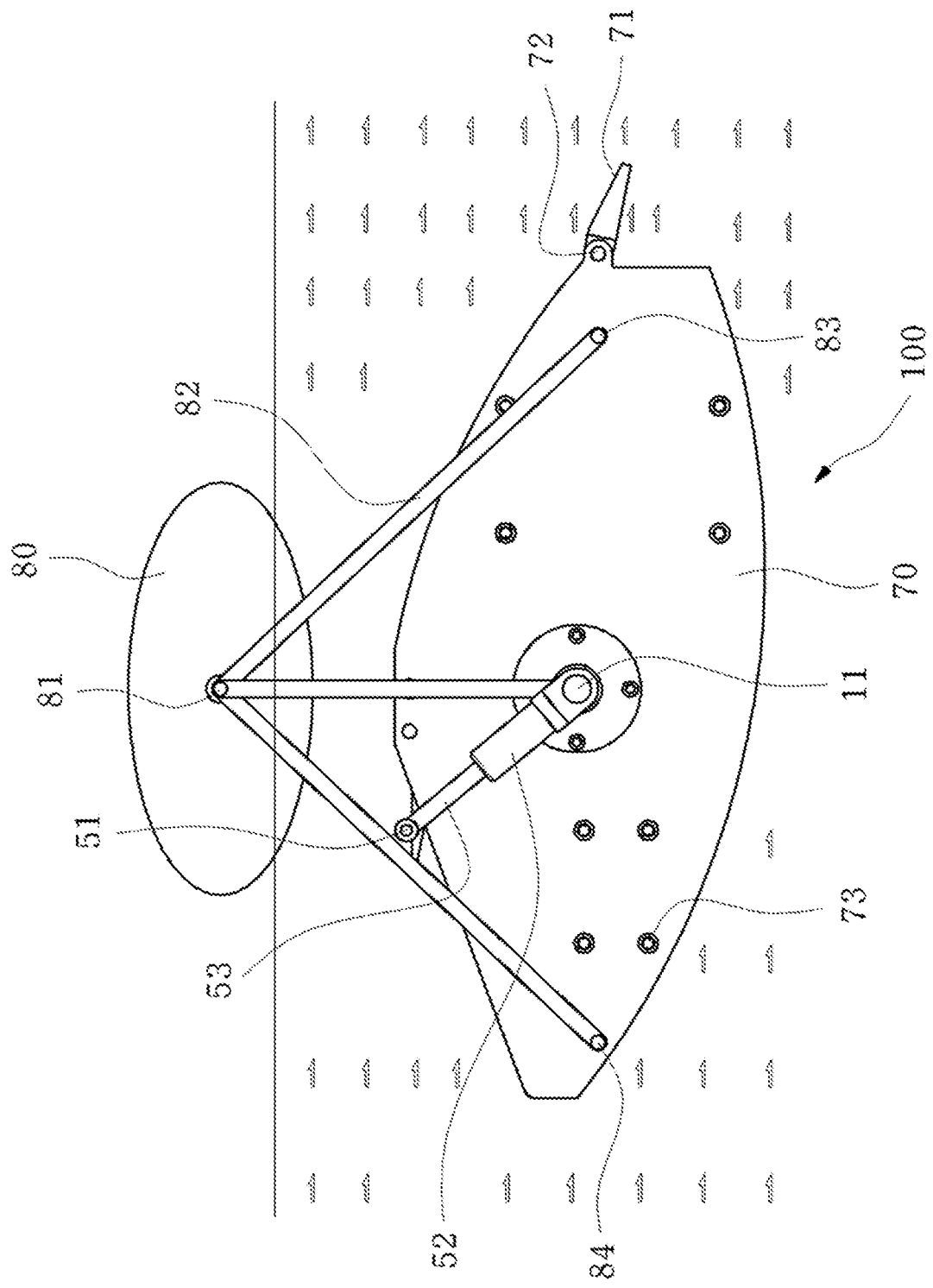
FIG. 12 is a front view when a flood power generation unit of the present invention is applied to a float.
Figure 13:
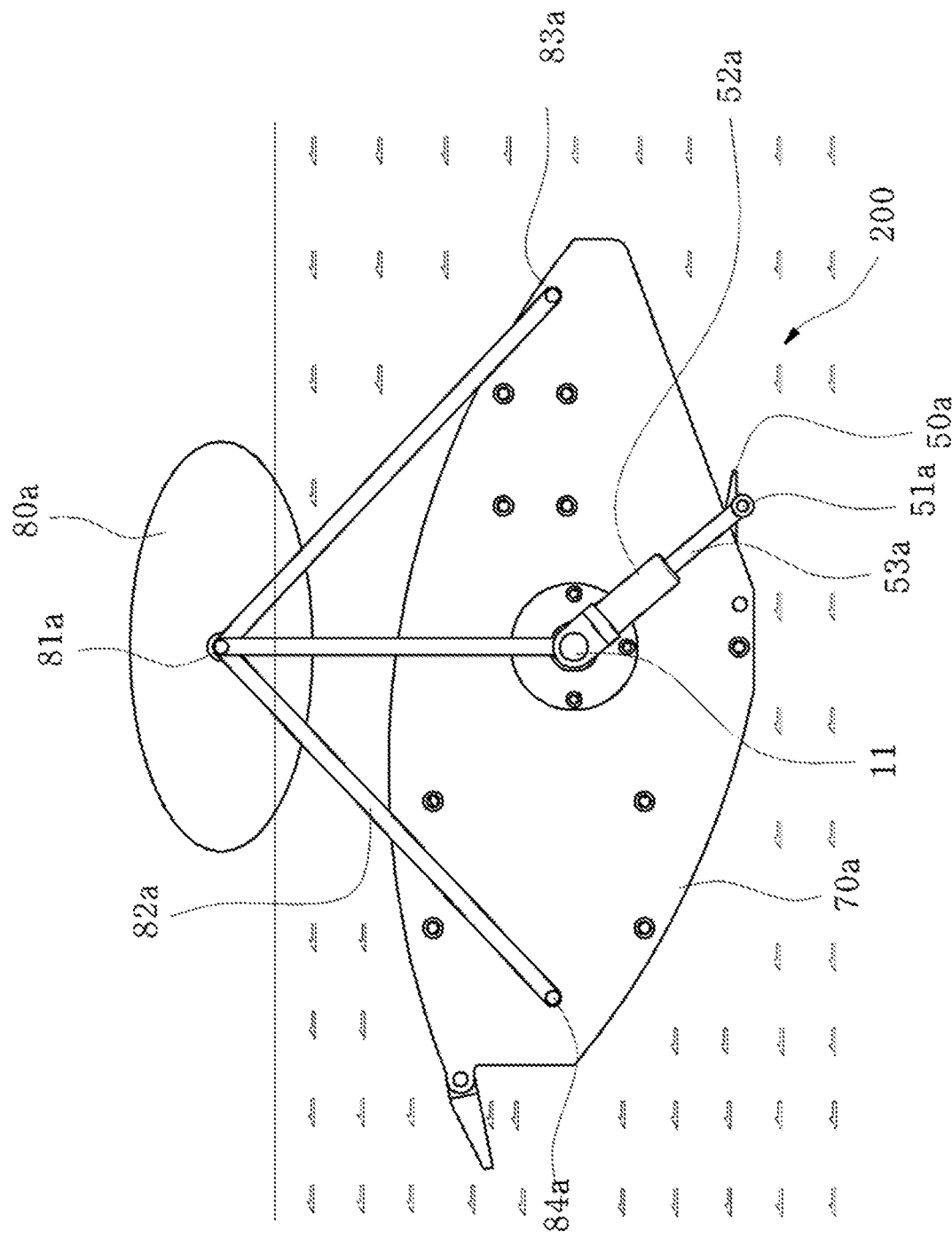
FIG. 13 is a front view when an ebb power generation unit of the present invention is applied to a float.
Figure 14:
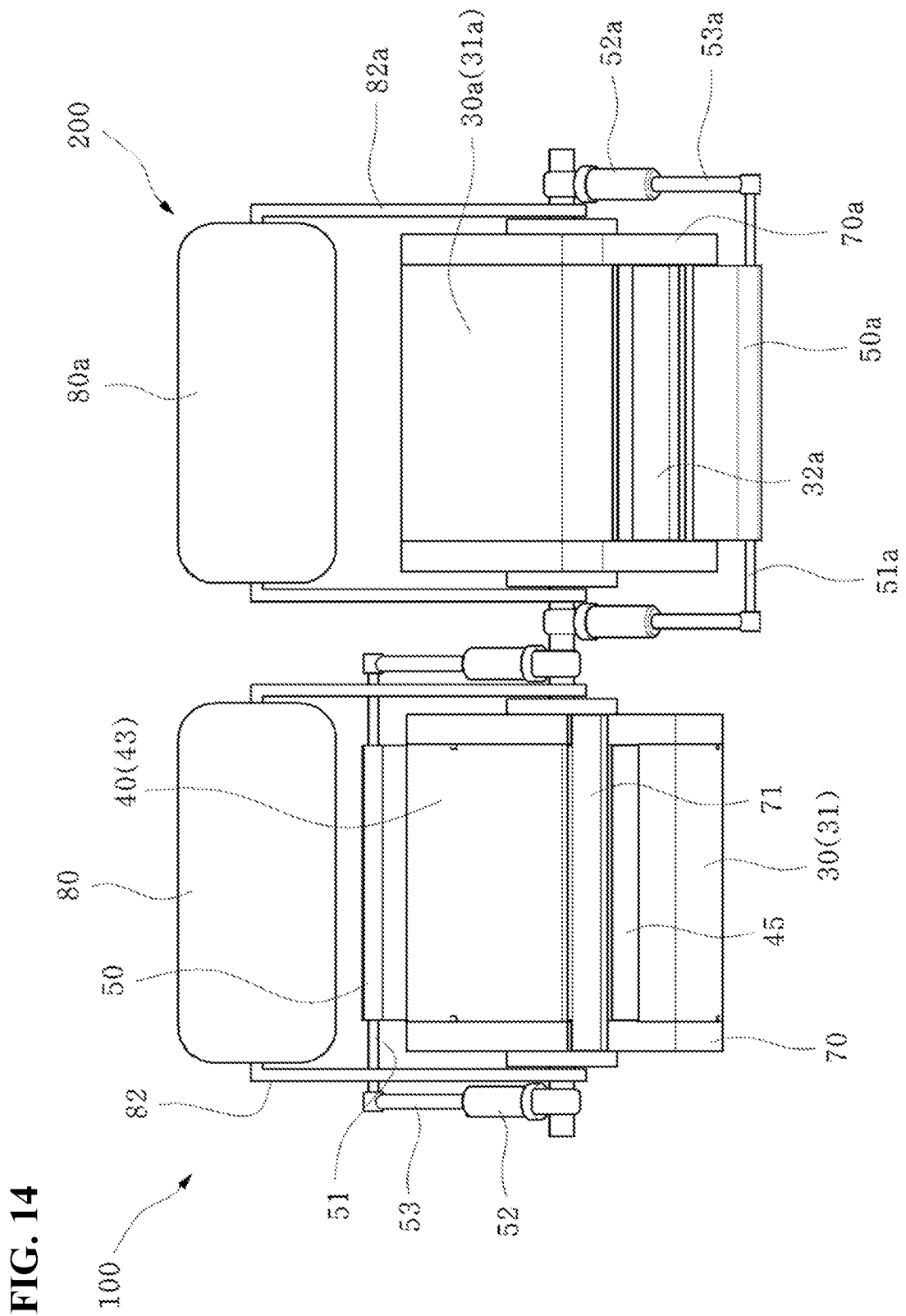
FIG. 14 is a front view when flood and ebb power generation units of the present invention are applied to a float.

FIG. 12 is a front view when a flood power generation unit of the present invention is applied to a float, FIG. 13 is a front view when an ebb power generation unit of the present invention is applied to a float, and FIG. 14 is a front view when flood and ebb power generation units of the present invention are applied to a float.

Float connection bars 82 and 82a are connected to lower couplers 84 and 84a and upper couplers 83 and 83a of the side guides 70 and 70a and the turbine shaft 11 of the flood power generation unit 100 and the ebb power generation unit 200. The float connection bars 82 and 82a meet each other at float couplers 81 and 81a and floats 80 and 80a are coupled to the float couplers 81 and 81a so that the flood power generation unit 100 and the ebb power generation unit 200 generate power under the sea while maintaining buoyancy.

Figure 15:
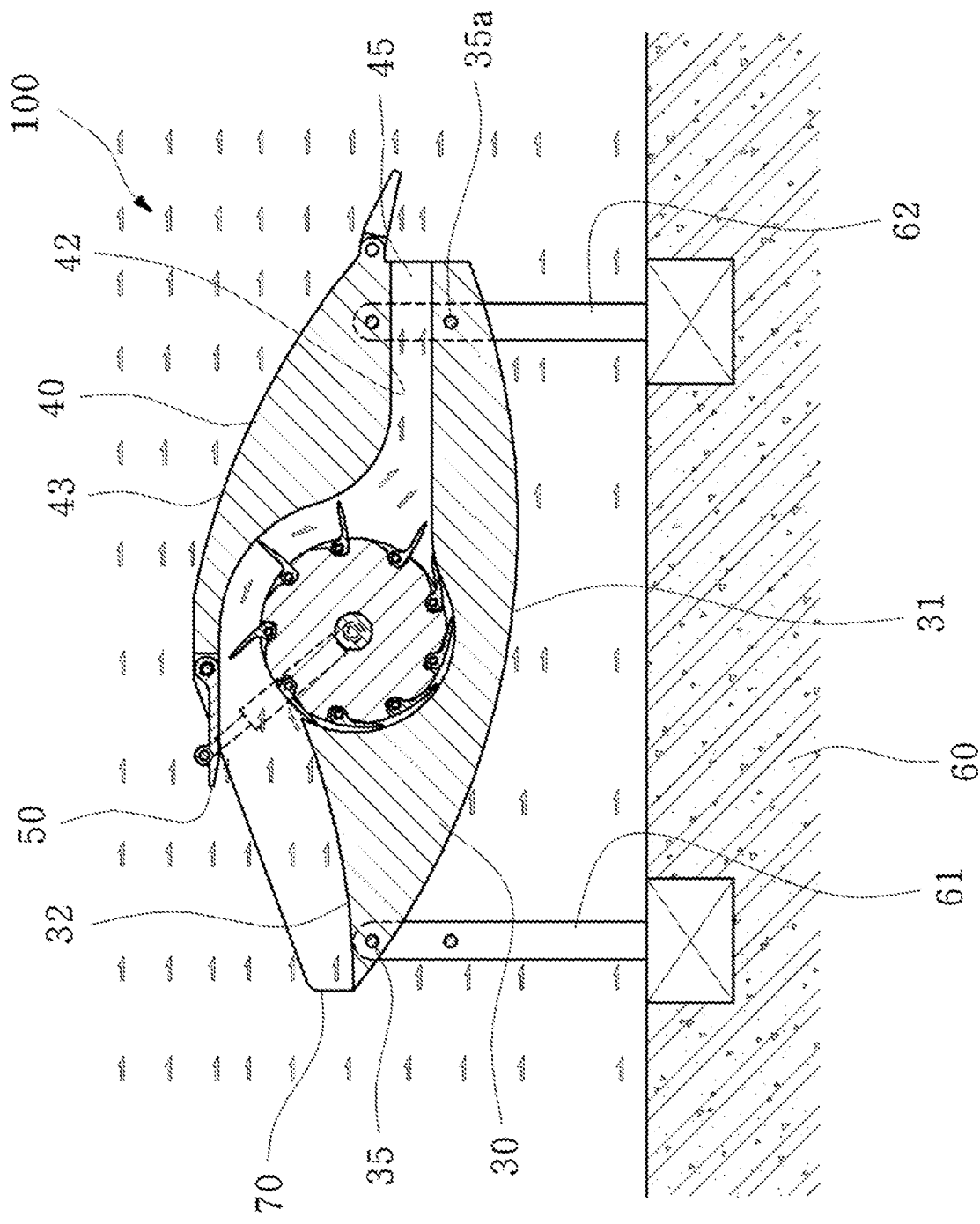
FIG. 15 is a front view when a flood power generation unit of the present invention is fixed to the ground.
Figure 16:
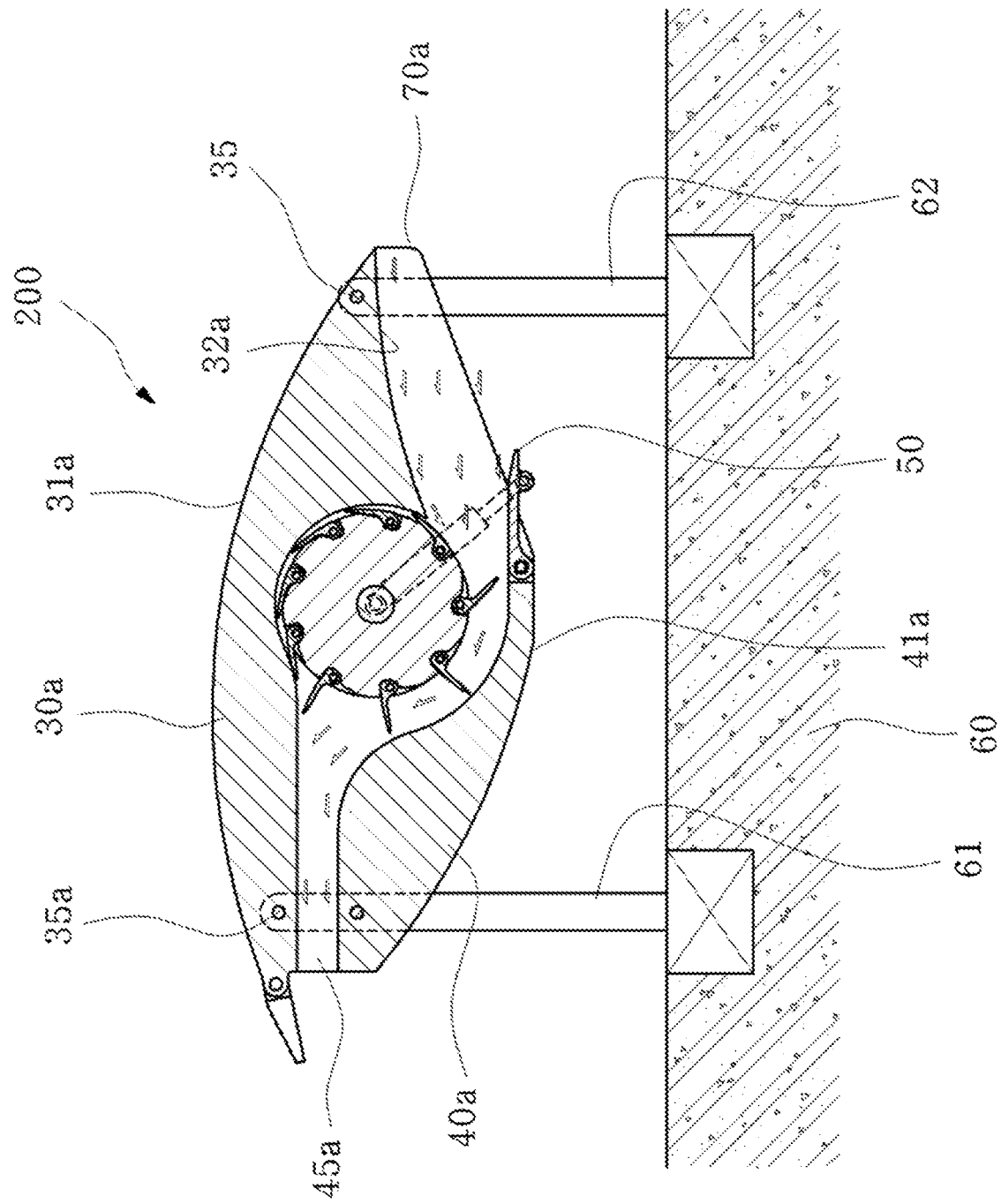
FIG. 16 is a front view when an ebb power generation unit of the present invention is fixed to the ground.
Figure 17:
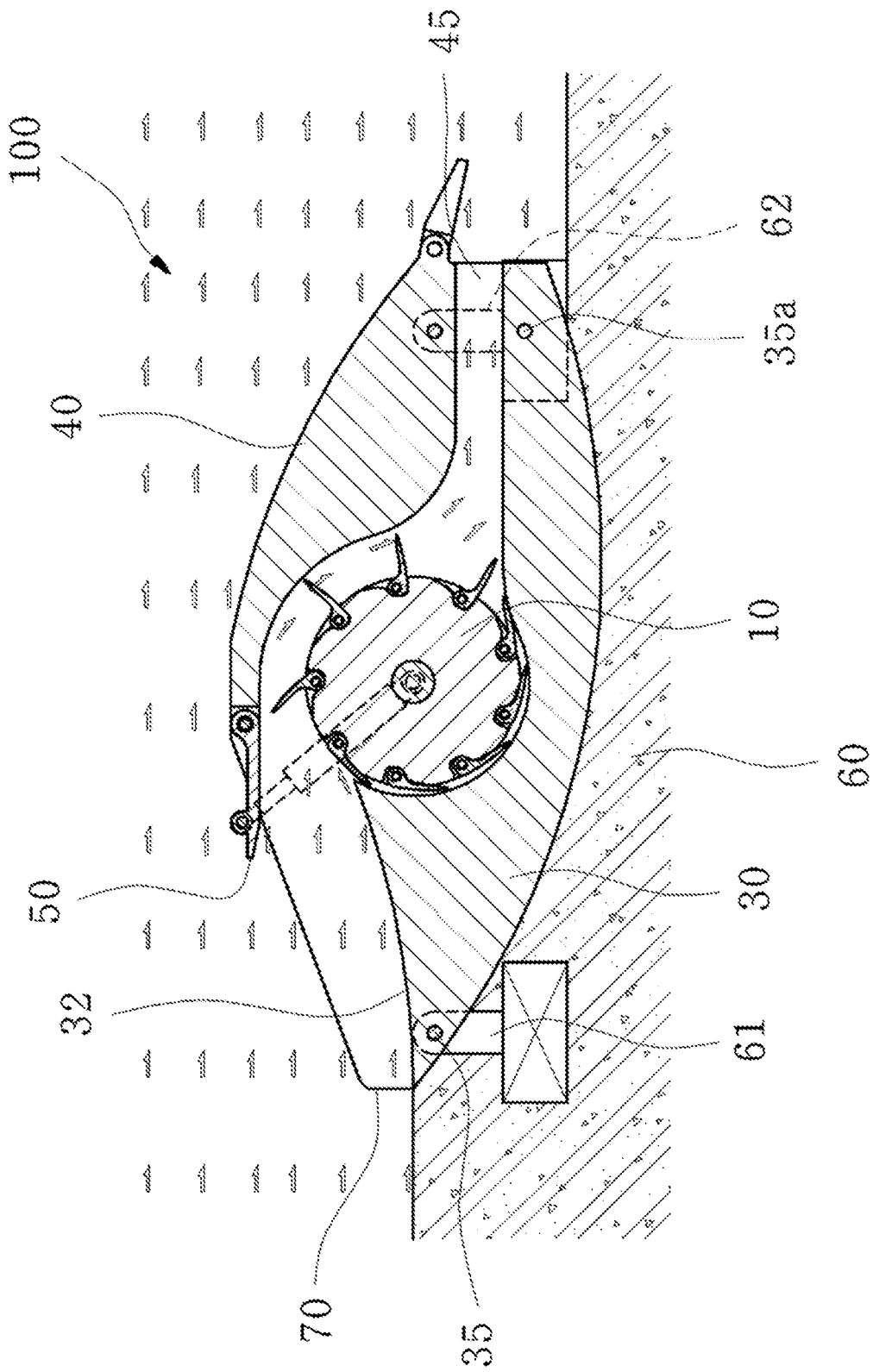
FIG. 17 is a front view when a flood power generation unit is fixed to the ground in accordance with another embodiment of the present invention.

FIG. 15 is a front view when a flood power generation unit of the present invention is fixed to the ground, FIG. 16 is a front view when an ebb power generation unit of the present invention is fixed to the ground, and FIG. 17 is a front view when a flood power generation unit is fixed to the ground in accordance with another embodiment of the present invention.

A concrete base 60 having predetermined width, height, and length is installed on the ground under the sea, height adjusters 61 and 62 are installed at a predetermine distance on the concrete base 60, and the side guides 70 and 70a are coupled to lower connection shafts 35 and 35a at both sides of the power generation units to hold the power generation units at a predetermined height on the height adjusters 61 and 62 so that flood tide and ebb tide can be used to generate power.

Alternatively, the side guides 70 may be installed on the ground under the sea with the lower guide 31 in contact with the concrete base 60, in which the height adjusters 61 and 62 are connected to lower connection shafts 35 and 35a so that flood tide on the bottom can be used to generate power.

According to the hydroelectric power generator using ebb and flow of seawater, the flood power generation unit 100 and the ebb power generation unit 200 may be alternately installed or sequentially installed, and their width, size, and number may be varied, depending on the installed position.

First, as for the flood power generation unit 100, the lower flow guide unit 30 is installed between the side guide units 70, the turbine 10 is rotatably disposed over the blade guide 33 of the lower flow guide unit 30 through the turbine shaft 11, and the upper flow guide unit 40 is installed between the side guide units 70.

The lower flow guide unit 30 and the upper flow guide unit 40 may be installed at various heights, depending on the area under the sea and a plurality of the guide units may be sequentially installed in series, depending on the installed position and width. Further, the installed position may be changed, depending on the circumstances of the site.

The power generator of the present invention can be sequentially installed as long as there is a high-speed marine current, flood tide and ebb tide occurs due to a tidal difference of seawater, and power generation is possible from the tidal difference. Accordingly, it is possible to perform hydroelectric power generation using eco-friendly energy at shores where flood tide and ebb tide exist or a shoal where a flow speed is high.

According to the present invention, when the power generator is installed under the sea, water is guided to the front and top of the turbine 10 along the streamlined shape of the flow guide 32 of the lower flow guide unit 30 and the amount of the water that is supplied to the turbine 10 is controlled by the control gate 50 at the front of the upper flow guide unit 40.

Since the amount of water needed for power generation is supplied by controlling the amount and speed of seawater by controlling the angle of the control gate 50, high-efficiency power generation can be achieved.

When water is supplied to the front top of the turbine 10 through the flow guide 32 and the control gate 50, the blades 20 reclined in the blade seats 12 with the front ends partially exposed on the outer side of the turbine 10 is deployed by the water.

Since the blades 20 are fixed in the blade seats 12 by the fixed shafts 21 and can be rotated by the bushings 22, they are deployed inside the power generation guide 41 by the water and force that moves the blades 20 is generated by the water, thereby providing torque for continuously rotating the turbine 10.

When the blades 20 are erected in the blade seats 12, the reinforcing portions 23 and the reinforcing grooves 13 fit to each other at the rounded corners of the L-shape, so the reinforcing portions 23 fit to the rear and bottom of the reinforcing grooves 13. Accordingly, torque can be stably provided even though load is applied to the blades 20 by the water, whereby a reinforcing effect can be achieved.

That is, the width and height of the blades 20 can vary and can be rotatably installed on the fixed shafts 21 by the bushings 22 on the outer side of the turbine 10. When the blades 20 have a large wide, uniform load is applied to the large widths of the reinforcing portions 23 and the reinforcing groove 13, so power generation can be performed without heavy load to the blades 20 and the turbine 10.

In detail, it is possible to control the speed and pressure of seawater applied to the blades 20 by controlling the amount of the seawater by controlling the angle of the control gate 50, so it is possible to achieve high-efficiency power generation by maximizing rotational energy by increasing the angular speed of the turbine 10.

The blades 20 and the turbine 10 show different efficiencies, depending on their materials, but they may be made of relatively light and strong metal.

The blades 20 are deployed and provide force for rotating the turbine 10 while passing through the arc-shaped power generation guide 41, and are partially blocked and naturally reclined into the blade seats 12 when they reach the blade guide 33 after passing the power generation guide 41. Further, the blades 20 reclined in the blade seats 12 pass the blade guide 33 and rotate with the turbine 10 without a loss of power.

In particular, the stream and the blades 20 rotate the turbine 10 by moving in the same direction, so high-efficiency power generation is possible.

Further, it is possible to increase the efficiency of power generation by increasing the angular speed at the same flow speed by adjusting the number and radius of the blades 20 on the turbine 10.

Further, a velocity head is generated by a predetermined gap between the front ends of the blades 20 and the power generation guide 41, so the same pressure is applied to the blades 20 by water inside the power generation guide 41. Further, when the blades 20 are deployed at the power generation guide 41 and two to five blades are rotated, torque corresponding to the number of the deployed blades 20 is applied to the turbine shaft 11, whereby high-frequency power generation is achieved.

The velocity head is described in detail. The power generation guide 41 has a predetermined gap from the outer side of the turbine 10 and maintains a predetermined gap from the front ends of the blades 20 when the blades 20 are deployed and rotated, thereby generating a velocity head, applying torque to the turbine 10, and applying the same flow rate and pressure to the blades 20 inside the power generation guide 41. Accordingly, when three blades 20 are deployed inside the power generation guide 41 by the flow rate applied to one blade 20, three-time larger torque is provided, as compared with the related art, thereby achieving high-efficiency power generation.

The seawater that has passed the power generation guide 41 passes through the drain space 45 between the lower drainage 34 and the upper drainage 42 and then acts on the door 71, so the door 71 rotates about the door shaft 72 to open and the seawater flows out of the power generator. Further, the lower drainage 34 and the upper drainage 42 are formed relatively long so that seawater passing the blades 20 can flow straight after the stream is curved, and the flow speed and pressure of the seawater flowing outside through the drain passage 45 are the same as or larger than those at the outside, whereby the seawater can easily flow outside.

The height of the drain space 45 can be adjusted in accordance with the installed positions of the lower flow guide unit 30 and the upper flow guide unit 40, so the turbine 10 submerged in the sea can use the largest flow speed and pressure of seawater, whereby efficiency can be improved.

The lower flow guide unit 30 guides seawater so that the seawater can be normally supplied to the turbine 10 through the flow guide 32, and the lower guide 31 allows the seawater flowing under it to normally flow without influence on the flow speed.

The upper flow guide unit 40 guides seawater so that the seawater can normally flow without influence on the flow speed of flood tide flowing over it with the upper guide 43 submerged in the sea, and the control gate 50 maintains the optimal power generation status by controlling the amount and speed of the seawater supplied to the turbine 10.

The door 71 cannot be maintained open when there is no flood tide, so it closes the drain space 45 by naturally rotating to prevent ebb tide from flowing into the drain space 45.

Next, as for the ebb power generation unit 200, the upper flow guide unit 30a is installed between the side guides 70a, the turbine 10 is rotatably coupled to the blade guide 33a of the upper flow guide unit 30a through the turbine shaft 11, and the lower flow guide unit 40a is installed between the side guides 70a.

According to the present invention, when the ebb power generation unit 200 is installed under the sea, water is guided to the front and top of the turbine 10 along the streamlined shape of the flow guide 32a of the upper flow guide unit 30a and the amount of the water that is supplied to the turbine 10 is controlled by the control gate 50a at the front of the lower flow guide unit 40a.

Since the amount of water needed for power generation is supplied by controlling the amount and speed of seawater by controlling the angle of the control gate 50a, high-efficiency power generation can be achieved.

When water is supplied to the front top of the turbine 10 through the flow guide 32a and the control gate 50a, the blades 20 reclined in the blade seats 12 with the front ends partially exposed on the outer side of the turbine 10 are deployed by the water.

Since the blades 20 are fixed in the blade seats 12 by the fixed shafts 21 and can be rotated by the bushings 22, they are deployed inside the power generation guide 41 by the water and force that moves the blades 20 is generated by the water, thereby providing torque for continuously rotating the turbine 10.

When the blades 20 are erected in the blade seats 12, the reinforcing portions 23 and the reinforcing grooves 13 fit to each other at the rounded corners of the L-shape, so the reinforcing portions 23 fit to the rear and bottom of the reinforcing grooves 13. Accordingly, torque can be stably provided even though load is applied to the blades 20 by the water, whereby a reinforcing effect can be achieved.

That is, the width and height of the blades 20 can be varied and can be rotatably installed on the fixed shafts 21 by the bushings 22 on the outer side of the turbine 10. When the blades 20 have a large wide, uniform load is applied to the large widths of the reinforcing portions 23 and the reinforcing groove 13, so power generation can be performed without heavy load to the blades 20 and the turbine 10.

In detail, it is possible to the speed and pressure of seawater applied to the blades 20 by controlling the amount of the seawater by controlling the angle of the control gate 50a, so it is possible to achieve high-efficiency power generation by maximizing rotational energy by increasing the angular speed of the turbine 10.

The blades 20 and the turbine 10 show different efficiencies, depending on their materials, but they may be made of relative light and strong metal.

The blades 20 are deployed and provide force for rotating the turbine 10 while passing through the arc-shaped power generation guide 41a, and are partially blocked and naturally reclined into the blade seats 12 when they reach the blade guide 33a after passing the power generation guide 41a. Further, the blades 20 reclined in the blade seats 12 pass the blade guide 33a and rotate with the turbine 10 without a loss of power.

The seawater that has passed the power generation guide 41a passes through the drain space 45a between the upper drainage 34a and the lower drainage 42a and then acts on the door 71a, so the door 71a rotate about the door shaft 72a to open and the seawater flows out of the power generator. Further, the lower drainage 34a and the upper drainage 42a are formed relatively long so that seawater passing the blades 20 can flow straight after the stream is curved, and the flow speed and pressure of the seawater flowing outside through the drain passage 45a are the same as or larger than those at the outside, whereby the seawater can easily flow outside.

The height of the drain space 45a can be adjusted in accordance with the installed positions of the upper flow guide unit 30a and the lower flow guide unit 40a, so the turbine 10 submerged in the sea can use the largest flow speed and pressure of seawater, whereby efficiency can be improved.

The upper flow guide unit 30a guides seawater so that the seawater can be normally supplied to the turbine 10 through the flow guide 32a, and the upper guide 31a having streamline shape allows the seawater flowing over it to normally flow without influence with the flow speed.

The lower flow guide unit 40a guides seawater so that the seawater can normally flow without influence on the flow speed of ebb tide flowing under it with the lower guide 43a submerged in the sea, and the control gate 50a maintains the optimal power generation status by controlling the amount and sped of the seawater supplied to the turbine 10.

The door 71a cannot maintain open when ebb tide does not flow into the drain space 45a and the force that can open the door 71a is removed, so the drain space 45a is closed and flood tide is prevented from flowing into the drain space 45a.

The turbine shaft is rotated in one direction so that power is continuously generated when the flood power generation unit 100 generates power using flood tide and the ebb power generation unit 200 generates power using ebb tide.

When the gate control cylinders 52 and 52a coupled to the turbine shaft 11 are operated and move forward and backward the cylinder shafts 53 and 53a, the gate shafts 51 and 51a of the control gates 50 and 50a are rotated, so the rotational angle of the control gates 50 and 50a about the gate rotary shafts 54 and 54a is controlled. When the control gates 50 and 50a are rotated upward, more seawater flows inside, and when the control gates 50 and 50a are rotated downward, less seawater flows inside. Accordingly, since the amount of seawater flowing inside is controlled in this way, it is possible to generate power with the optimal efficiency of the turbine 10 by controlling the flow speed of seawater.

A gear can be disposed at an end of the turbine shaft 11 to supply the generated power to a desired place or a power generation system may be connected to the end to transmit power to a desired place after the power is generated.

On the other hand, according to the present invention, as shown in FIGS. 12 to 14, the float connection bars 82 and 82a are connected to the upper couplers 83 and 83a and the lower couplers 84 and 84a from the float couplers 81 and 81a to use buoyancy of the floats 80 and 80a, thereby generating power using the flow speed of flood tide and ebb tide with the flood power generation unit 100 and the ebb power generation unit 200 submerged in the sea.

Further, as shown in FIGS. 15 to 17, the concrete base 60 can be installed on the ground under the sea, the height adjusters 61 and 62 are installed at predetermined distance from each other, and the flood power generation unit 100 and the ebb power generation unit 200 are installed by coupling the side guides 70 and 70a to the lower connection shafts 35 and 35a, whereby the installation position can be determined in accordance with the height of flood tide and ebb tide. Accordingly, it is possible to provide optimal flow speed and pressure for power generation from flood tide and ebb tide. Further, the inclination angle of the control gates 50 and 50a at the fronts of the upper and lower flow guide units 40 and 40a can be controlled by controlling the gate control cylinders 52 and 52a and the cylinder shafts 53 and 53a, whereby the amount of seawater flowing to the turbine 10 can be controlled. Accordingly, it is possible to achieve high-efficiency power generation by providing optical flow speed and pressure for power generation by increasing flow speed and pressure of seawater by increasing the inflow amount of the seawater, when the flow speed is low.

Further, when the power generation units are installed on the concrete base 60, power is generated using the marine current flowing on the ground. Further, the height of the top of the concrete base 60 and the height of the front of the flow guide 32 inside the side guide units 70 and 70a are made the same so that a marine current directly flows to the turbine 10. Further, since it is possible to control the amount of seawater flowing to the turbine 10 by controlling the inclination angle of the control gate 50 at the front of the upper flow guide unit 40 by controlling the cylinder shafts 53 of the gate control cylinders 52, it is possible to achieve high-efficiency power generation by providing optimal flow speed and pressure for power generation by increasing flow speed and pressure of seawater by increasing the inflow amount of the seawater, when the flow speed is low.

The present invention is not limited to the exemplary embodiments described above and may be modified in various ways by those skilled in the art, and the modifications should be construed as being included in the similar range defined by the patent laws.

The present invention provides a power generator that can efficiently generate power by continuously rotating a turbine in the same direction at high tide and low tide, using eco-friendly energy of flood tide and ebb tide by controlling the amount and flow speed of seawater through a control gate when generating power using flood tide and ebb tide at a high speed.

What is claimed is:

1. A hydroelectric power generator using ebb and flow of seawater, the hydroelectric power generator comprising:
   a flood power generation unit including:
   a first lower flow guide unit disposed between first side guides and having a first blade guide at a downstream end of a first flow guide;
   a first turbine disposed on a turbine shaft over the first lower flow guide unit, having first reinforcing grooves formed in first blade seats formed on an outer side of the first turbine such that first reinforcing portions of first blades fit to two sides of the first turbine, and having first fixed shafts disposed through the first blade seats;
   the first blades fitted on the first fixed shafts passing through the first turbine in the first blade seats to be deployed by seawater and rotate the first turbine; and
   a first upper flow guide unit disposed over the first lower flow guide unit between the first side guides and having a first power generation guide in which the first blades on the outer side of the first turbine are deployed and moved, and
   an ebb power generation unit including:
   a second upper flow guide unit disposed between second side guides and having a second blade guide at a downstream end of a second flow guide;
   a second turbine disposed on the turbine shaft under the second upper flow guide unit, having second reinforcing grooves formed in second blade seats formed on an outer side of the second turbine such that second reinforcing portions of second blades fit to two sides of the second turbine, and having second fixed shafts disposed through the second blade seats;
   the second blades fitted on the second fixed shafts disposed through the second turbine in the second blade seats to be deployed and rotate the second turbine by seawater; and
   a second lower flow guide unit disposed under the second upper flow guide unit between the second side guides and having a second power generation guide in which the second blades on the outer side of the second turbine are deployed and moved,
   wherein the first lower flow guide unit has a first lower guide having a streamlined bottom, the first blade guide where the first turbine is disposed is formed at a downstream end of the first flow guide, and a first lower drainage horizontally forming a first drain space is formed at a downstream end of the first blade guide, and
   the first blades are fitted on the first fixed shafts, are rotatably coupled at both sides by first movable bushings, have an outer end protruding from the first blade seats, and have the first reinforcing portion fitting to two sides of the first reinforcing grooves, and
   wherein the first turbine covers are coupled to both sides of the first turbine, the first fixed shafts are coupled to the first turbine covers through the first blades, the first movable bushings are fitted on portions of the first fixed shafts disposed in the first blades, and first fixed bushings are fitted on portions of the first fixed shafts disposed in the first turbine covers, and
   second turbine covers are coupled to both sides of the second turbine, the second fixed shafts are coupled to the second turbine covers through the second blades, second movable bushings are fitted on portions of the second fixed shafts disposed in the second blades, and second fixed bushings are fitted on portions of the second fixed shafts disposed in the second turbine covers.

2. The hydroelectric power generator of claim 1, wherein a first door is coupled to the first side guides through a first door shaft to be able to open and close at a downstream end of the first drain space, and
   a second door is coupled to the second side guides through a second door shaft to be able to open and close at a downstream end of a second drain space.

3. The hydroelectric power generator of claim 1, wherein the first turbine is disposed such that a gap from the first blade guide is small to recline the first blades and such that a gap from the first power generation guide is large to deploy the first blades by flow of seawater, and is combined with first fixed bushings at both sides to be able to rotate between the first side guides, and
   the second turbine is disposed such that a gap from the second blade guide is small to recline the second blades and such that a gap from the second power generation guide is large to deploy the second blades by flow of seawater, and is combined with second fixed bushings at both sides to be able to rotate between the second side guides.

4. The hydroelectric power generator of claim 1, wherein the first upper flow guide unit has a first upper drainage forming the first drain space at a downstream end of the first power generation guide formed around the outer side of the first turbine and has a first streamlined upper guide formed on a top thereof.

5. The hydroelectric power generator of claim 1, wherein a first control gate for controlling the amount of seawater supplied to the first turbine by being adjusted in angle by a first gate rotary shaft is coupled to an upstream end of the first upper flow guide unit, and
   a second control gate for controlling the amount of seawater supplied to the second turbine by being adjusted in angle by a second gate rotary shaft is coupled to an upstream end of the second lower flow guide unit.

6. The hydroelectric power generator of claim 5, wherein a first cylinder shaft connected to the first gate shaft is connected to the turbine shaft through a first gate control cylinder to control the angle of the first control gate, and
   a second cylinder shaft connected to the second gate shaft is connected to the turbine shaft through a second gate control cylinder to control the angle of the second control gate.

7. The hydroelectric power generator of claim 1, wherein the second upper flow guide unit has a second upper guide having a streamline shape on a top thereof, a second blade guide where the second turbine is disposed is formed at a downstream end of the second flow guide, and a second upper drainage horizontally forming the second drain space is formed at a downstream end of the second blade guide.

8. The hydroelectric power generator of claim 1, wherein the second lower flow guide unit has a second lower drainage forming the second drain space at a downstream end of the second power generation guide formed around the outer side of the second turbine and has a second lower guide having a streamline shape formed on a bottom thereof.

9. The hydroelectric power generator of claim 1, wherein the first lower flow guide unit and the first upper flow guide unit are disposed between the first side guides, first turbine covers are rotatably coupled to both sides of the first turbine such that the turbine shaft rotates through the first turbine covers, and the second upper flow guide unit and the second lower flow guide unit are disposed between the second side guides, second turbine covers are rotatably coupled to both sides of the second turbine such that the turbine shaft rotates through the second turbine covers.

10. The hydroelectric power generator of claim 1, wherein the first power generation guide is formed at a first predetermined distance from the outer side of the first turbine such that the first blades make velocity heads with regular intervals between the first power generation guide and ends of the first blades while moving in a deployed position to apply torque to the first turbine and receive the same flow rate and pressure inside the first power generation guide, and the second power generation guide is formed at a second predetermined distance from the outer side of the second turbine such that the second blades make velocity heads with regular intervals between the second power generation guide and ends of the second blades while moving in a deployed position to apply torque to the second turbine and receive the same flow rate and pressure inside the second power generation guide.

11. The hydroelectric power generator of claim 1, wherein the flood power generation unit is installed with a first float on the sea by connecting first float connection bars to a first float coupler on both sides of the first float and connecting the first float connection bars to first couplers, and the ebb power generation unit is installed with a second float on the sea by connecting second float connection bars to a second float coupler on both sides of the second float and connecting the second float connection bars to second couplers.

12. The hydroelectric power generator of claim 1, wherein the flood power generation unit is installed on the ground under the sea in contact with a concrete base connected with height adjusters through connection shafts, or is floated in the sea such that seawater flows under the flood power generation unit.

* * * * *